US011915077B2

(12) United States Patent
Obstfeld et al.

(10) Patent No.: US 11,915,077 B2
(45) Date of Patent: Feb. 27, 2024

(54) URL VALIDATION AND REDIRECTION FOR SCANNABLE CODES

(71) Applicant: Cisco Technology, Inc., San Jose, CA (US)

(72) Inventors: Joel Abraham Obstfeld, Bushey (GB); Pete Rai, Egham (GB); Marcelo Yannuzzi, Vufflens-la-Ville (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/462,814

(22) Filed: Aug. 31, 2021

(65) Prior Publication Data

US 2023/0065676 A1   Mar. 2, 2023

(51) Int. Cl.
  *G06K 19/06*   (2006.01)
  *H04L 67/146*   (2022.01)

(52) U.S. Cl.
  CPC ...... *G06K 19/06037* (2013.01); *H04L 67/146* (2013.01)

(58) Field of Classification Search
  CPC   G06K 19/06037; H04L 67/146; H04W 12/06
  USPC ........................................................ 235/494
  See application file for complete search history.

(56) References Cited

U.S. PATENT DOCUMENTS

| | | | |
|---|---|---|---|
| 9,203,824 B1 * | 12/2015 | Nunn | ..................... G06F 21/31 |
| 9,348,929 B2 | 5/2016 | Eberlein | |
| 9,396,376 B1 | 7/2016 | Narayanaswami | |
| 9,589,218 B2 | 3/2017 | Ciavatta | |
| 9,594,993 B2 | 3/2017 | Picard et al. | |
| 9,715,554 B2 | 7/2017 | Kandregula | |
| 9,805,123 B2 * | 10/2017 | Nair | ..................... G06F 16/9535 |
| 10,127,724 B2 | 11/2018 | Carre et al. | |
| 2016/0323107 A1 * | 11/2016 | Bhogal | ................. H04W 12/10 |

(Continued)

FOREIGN PATENT DOCUMENTS

WO   2018086515   5/2018

OTHER PUBLICATIONS

"URL Shortening", online: https://en.wikipedia.org/wiki/URL_shortening, Jul. 19, 2021, 10 pages, Wikimedia Foundation, Inc.

(Continued)

*Primary Examiner* — Ahshik Kim
(74) *Attorney, Agent, or Firm* — BEHMKE INNOVATION GROUP LLC; James M. Behmke; James J. Wong

(57) ABSTRACT

In one embodiment, a code authentication service maintains a mapping of uniform resource locators and key information embedded into codes. The code authentication service receives, from a requesting device, a domain name system resolution request for a particular uniform resource locator. The code authentication service determines, based on the mapping, whether the domain name system resolution request is associated with valid key information for the particular uniform resource locator. The code authentication service provides, to the requesting device, a domain name system resolution response that indicates an address associated with the particular uniform resource locator, when the code authentication service determines that the domain name system resolution request includes valid key information for the particular uniform resource locator.

18 Claims, 8 Drawing Sheets

(56) References Cited

U.S. PATENT DOCUMENTS

| | | | | |
|---|---|---|---|---|
| 2020/0226617 | A1* | 7/2020 | Meadow | G06K 19/06037 |
| 2020/0364323 | A1* | 11/2020 | Bendersky | G06K 19/06037 |
| 2021/0217006 | A1* | 7/2021 | Ragavan | G06F 3/1238 |
| 2021/0377309 | A1* | 12/2021 | Jogand-Coulomb | G06K 7/10366 |
| 2022/0210146 | A1* | 6/2022 | Dhanabalan | H04L 67/02 |

OTHER PUBLICATIONS

"Qryptal Explained in Two Minutes", online: https://www.qryptal.com/landingpages/signed-qr-code/, accessed Aug. 10, 2021, 10 pages, Qryptal.com.

Aamoth, Doug, "Beware the square: how to spot malicious QR codes", onine: https://news.sophos.com/en-us/2019/10/17/beware-the-square-how-to-spot-malicious-qr-codes/, Oct. 17, 2019, accessed Aug. 10, 2021, 8 pages, Sophos News.

Ulikowski, Marcin, "dnstwist", online: https://github.com/elceef/dnstwist, Dec. 28, 2020, accessed Aug. 10, 2021, 7 pages, GitHub, Inc.

Sporny, et al., "Verifiable Credentials Data Model 1.0: Expressing verifiable information on the Web", online: https://www.w3.org/TR/vc-data-model/, Nov. 19, 2019, accessed Aug. 10, 2021, 122 pages, W3C.org.

Chathu, "Scan QR Code for Malware with Norton Snap QR Code Reader", online: https://www.androidgadgematic.com/2012/02/importance-of-use-norton-snap-qr-code.html, Feb. 2012, accessed Aug. 10, 2021, 7 pages, Android Gadgematic.

Meruga, et al. "Multi-Layered Covert QR Codes for Increased Capacity and Security", International Journal of Computers and Applications, 2015, vol. 37, No. 1, 12 pages, Taylor and Francis.

\* cited by examiner

URL VALIDATION AND REDIRECTION FOR SCANNABLE CODES

TECHNICAL FIELD

The present disclosure relates generally to computer networks, and, more particularly, to uniform resource locator (URL) validation and redirection for scannable codes.

BACKGROUND

Scannable code, such as Quick Response (QR) codes, certain barcodes, and the like, are increasingly being used to embed URLs for a variety of purposes. For instance, an embedded URL in a QR code attached to a consumer product may link to a website that provides the consumer with additional information about the product. In other instances, an embedded URL may be used for purposes of tracking an item during transit. Thus, if a client device scans the QR code, it may be redirected to the website located at the URL.

Regardless of the intended purpose of an embedded URL in a scannable code, there is an incorrect assumption that the URL, as well as the code itself, is not malicious. However, this is not always the case, leading to a potential security risk. In some instances, a malicious actor may attach a scannable code to something with an embedded URL that closely mimic a legitimate URL, but differ by one or more similar characters (e.g., by replacing the letter "O" with a zero, etc.). To complicate this even further, embedded URL are also now typically leveraging URL shorteners, increasing the potential for the end user to not notice that they were not redirected to a legitimate website, which could be used for purposes of installing malware, phishing, or other malicious activity.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
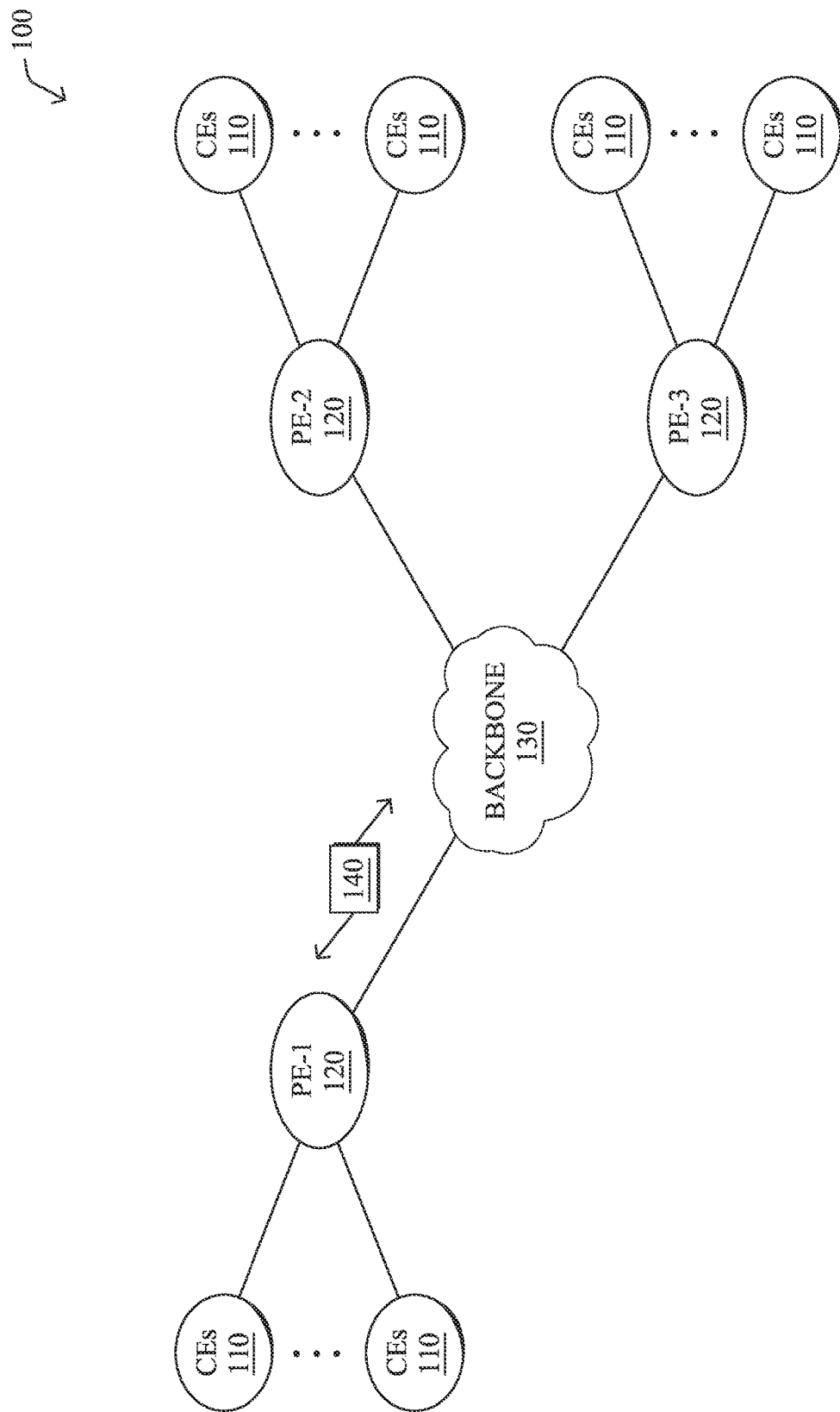
FIGS. 1A-1B illustrate an example communication network.

According to one or more embodiments of the disclosure, a code authentication service maintains a mapping of uniform resource locators and key information embedded into codes. The code authentication service receives, from a requesting device, a domain name system resolution request for a particular uniform resource locator. The code authentication service determines, based on the mapping, whether the domain name system resolution request is associated with valid key information for the particular uniform resource locator. The code authentication service provides, to the requesting device, a domain name system resolution response that indicates an address associated with the particular uniform resource locator, when the code authentication service determines that the domain name system resolution request includes valid key information for the particular uniform resource locator.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2) Site Type B: a site connected to the network by the CE router via two primary links (e.g., from different Service Providers), with potentially a backup link (e.g., a 3G/4G/5G/LTE connection). A site of type B may itself be of different types:

2a) Site Type B1: a site connected to the network using two MPLS VPN links (e.g., from different Service Providers), with potentially a backup link (e.g., a 3G/4G/5G/LTE connection).

2b) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
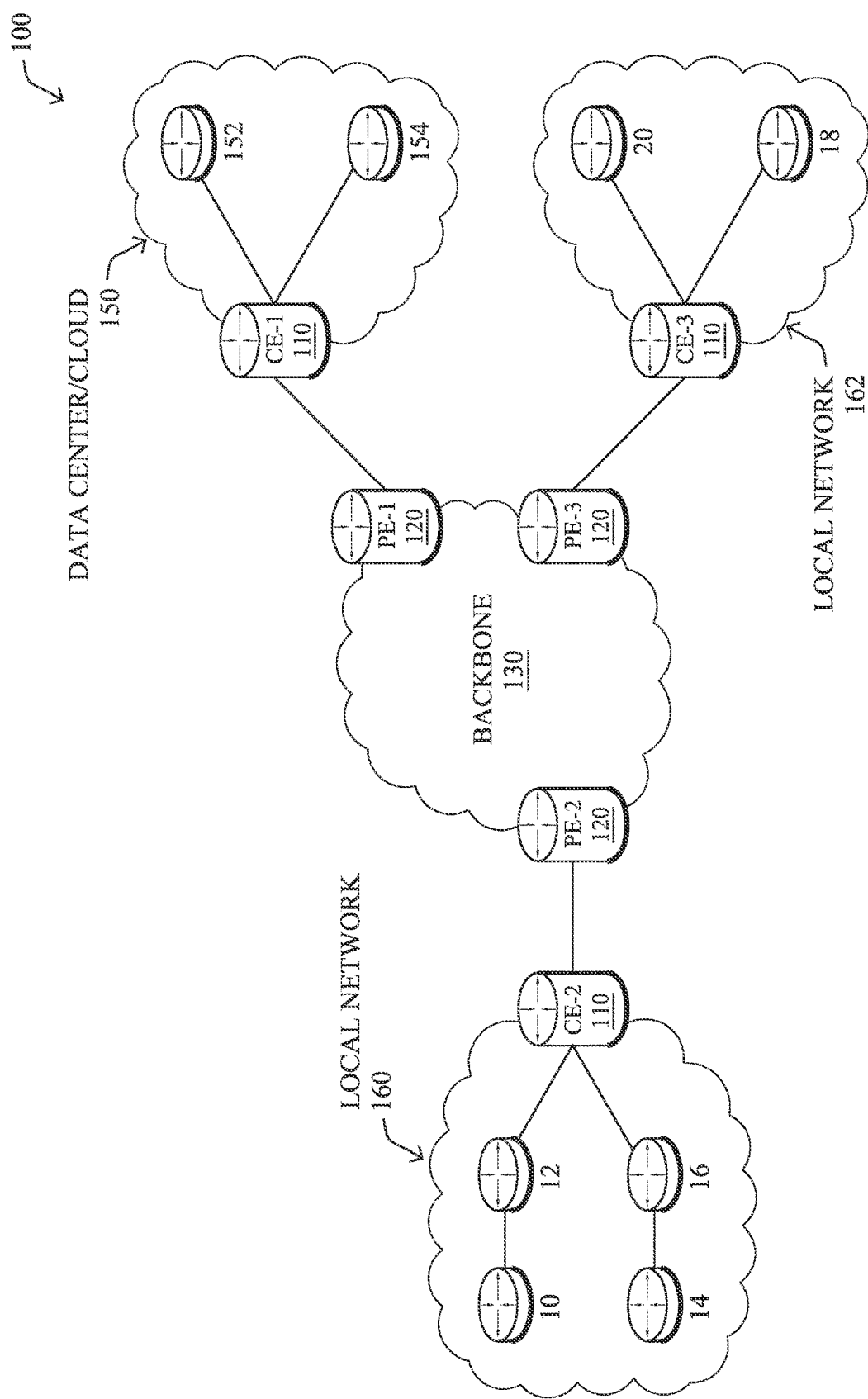

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
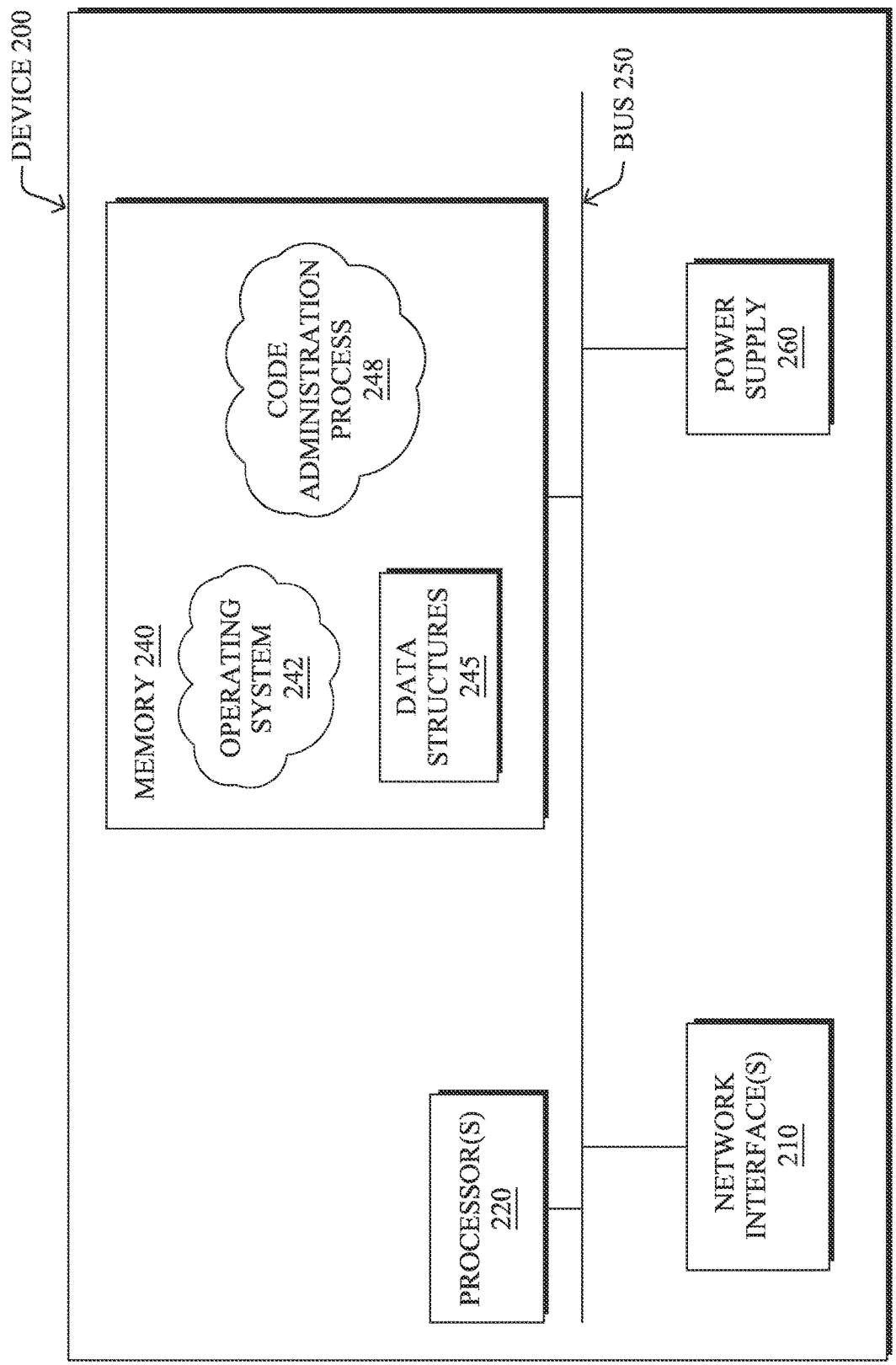
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a code administration process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, scannable code, such as Quick Response (QR) codes, certain barcodes, and the like, are increasingly being used to embed uniform resource locators (URLs) for a variety of purposes. For instance, an embedded URL in a QR code attached to a consumer product may link to a website that provides the consumer with additional information about the product. In other instances, an embedded URL may be used for purposes of tracking an item during transit. Thus, if a client device scans the QR code, it may be redirected to the website located at the URL.

Regardless of the intended purpose of an embedded URL in a scannable code, there is an incorrect assumption that the URL, as well as the code itself, is not malicious. However, this is not always the case, leading to a potential security risk. In some instances, a malicious actor may attach a scannable code to something with an embedded URL that closely mimic a legitimate URL, but differ by one or more similar characters (e.g., by replacing the letter "O" with a zero, etc.). To complicate this even further, embedded URL are also now typically leveraging URL shorteners, increasing the potential for the end user to not notice that they were not redirected to a legitimate website, which could be used for purposes of installing malware, phishing, or other malicious activity URL Validation and Redirection for Scannable Codes The techniques herein introduce systems and methods to encode a verifiable URL within a scannable code (e.g., a QR code, etc.), such that the URL obtained by scanning the QR code can be verified and validated before the client attempts to access the corresponding URL. Indeed, a growing concern today is that there is an implicit trust that exists in QR and similar codes that the information that they convey is trustworthy, which is not always the case. The implicit trust of QR codes exposes not only the client to risk but also the company or brand linked to the QR code.

Illustratively, the techniques described herein may be performed by hardware, software, and/or firmware, such as in accordance with code administration process 248, which may include computer executable instructions executed by the processor 220 (or independent processor of interfaces 210) to perform functions relating to the techniques described herein.

Specifically, according to various embodiments, a code authentication service maintains a mapping of uniform resource locators and key information embedded into codes. The code authentication service receives, from a requesting device, a domain name system resolution request for a particular uniform resource locator. The code authentication service determines, based on the mapping, whether the domain name system resolution request is associated with valid key information for the particular uniform resource locator. The code authentication service provides, to the requesting device, a domain name system resolution response that indicates an address associated with the particular uniform resource locator, when the code authentication service determines that the domain name system resolution request includes valid key information for the particular uniform resource locator.

Figure 3:
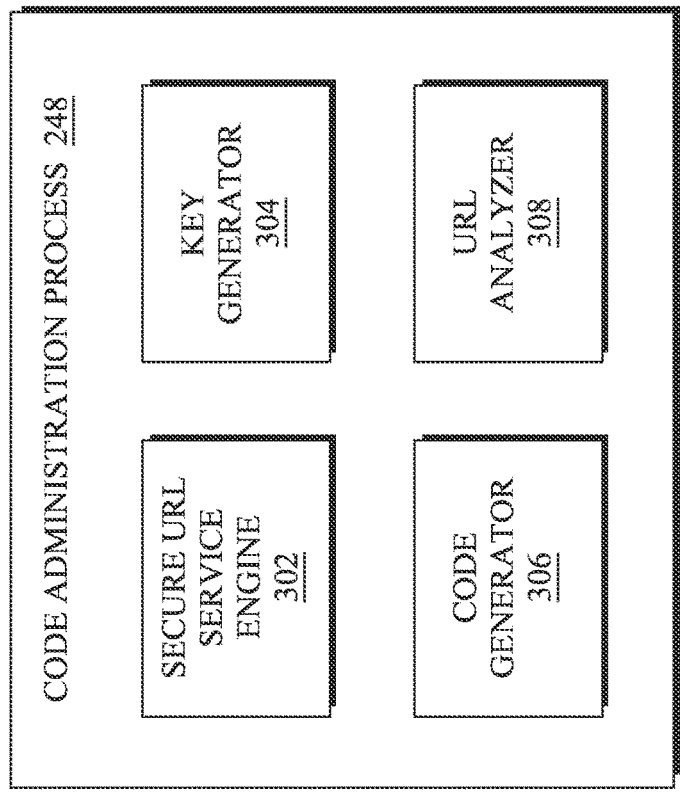
FIG. 3 illustrates an example architecture for generating and validating uniform resource locators (URLs)

Operationally, FIG. 3 illustrates an example architecture 300 for a code administration service, according to various embodiments. At the core of architecture 300 is code administration process 248, which may be executed by a device that provides a collaboration service in a network, or another device in communication therewith. As shown, code administration process 248 may include any or all of the following components: a secure URL service engine 302, a key generator 304, a code generator 306, and/or a URL analyzer 308. As would be appreciated, the functionalities of these components may be combined or omitted, as desired. In addition, these components may be implemented on a singular device or in a distributed manner, in which case the combination of executing devices can be viewed as their own singular device for purposes of executing code administration process 248.

During execution, secure URL service engine 302 may operate to provide a code authentication service to any number of networks and devices. Typically, the code authentication service may be hosted in a particular datacenter or in the cloud, although the service could also be hosted in other locations, as well. In various embodiments, URL service engine 302 may be primarily responsible for handling any incoming requests or outgoing responses by the code authentication service. To this end, URL service engine 302 may also be responsible for maintaining account information for authorized users or organizations that utilize the service. For instance, different organizations may register accounts with the code authentication service, in order to generate secure QR codes that they can attach to their shipped goods.

Key generator 304 is primarily responsible for generating the cryptographic key information that is used by the code authentication service for purposes of proving the authenticity of a particular URL embedded into a scannable code. For instance, as detailed below, key generator 304 may generate a new key when the code authentication service generates a new QR code for an organization. This key can then be used in conjunction with the QR code to prove that its embedded URL is authentic.

Code generator 306 may be responsible for generating a scannable code on behalf of a user or organization of the code authentication service. For instance, code generator 306 may generate a QR code that includes an embedded URL that can be verified as authentic by an end user device.

URL analyzer 308 may be responsible for analyzing a URL embedded into a code that has been scanned by an end user device. In turn, URL analyzer 308 may assess the key information associated with this URL, to determine whether the URL is genuine and matches a mapping of URLs and key information stored by the code authentication service. If the provided URL matches an entry in the mapping, this indicates that the URL is genuine and that the scannable code was not altered or replaced.

Figure 4:
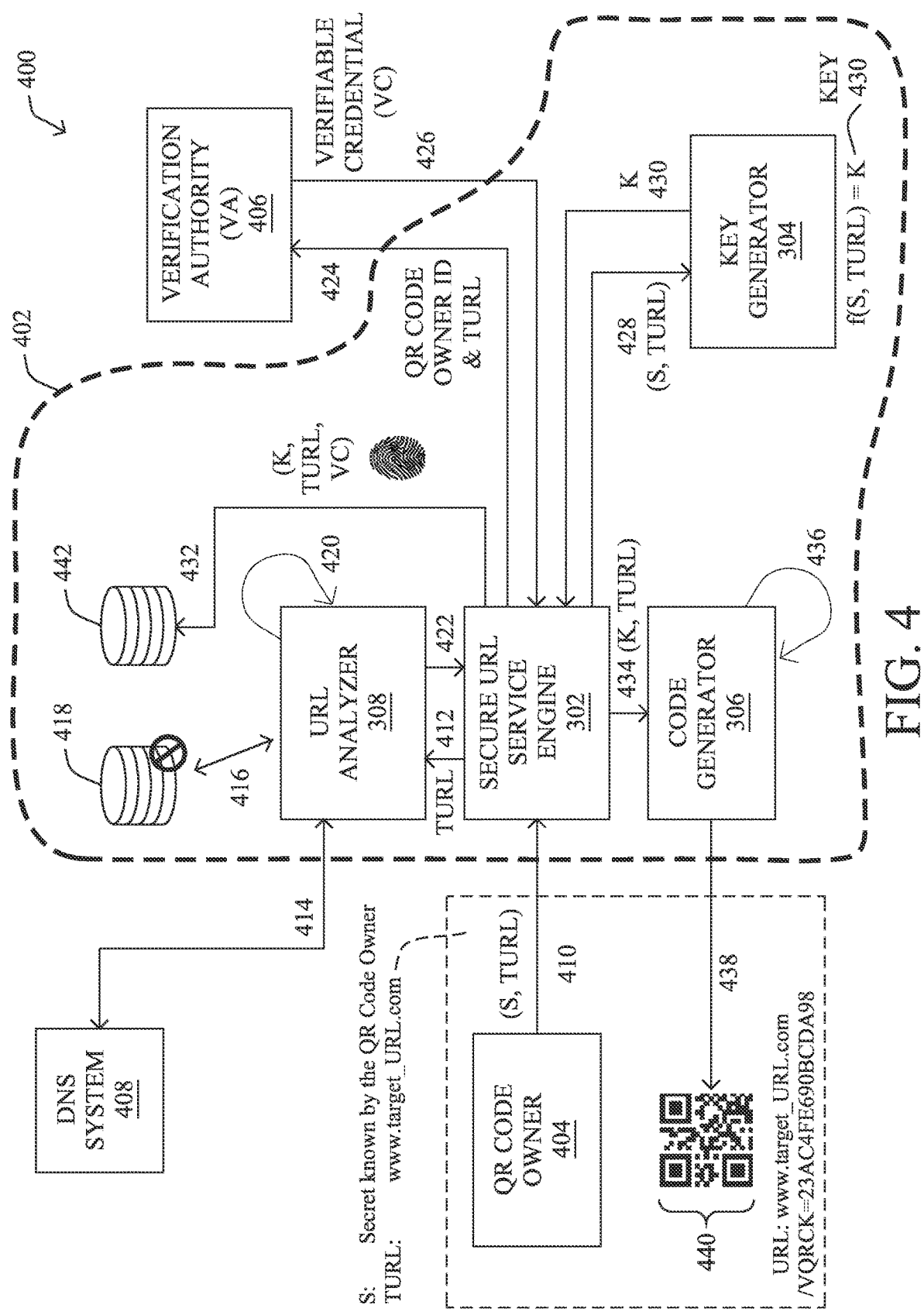
FIG. 4 illustrates an example of a code administration service being used to generate a scannable code.

FIG. 4 illustrates an example 400 of a code administration service 402 being used to generate a scannable code, according to various embodiments. As noted above, code administration service 402 may be implemented through the execution of code administration process 248. Accordingly, the components 302-308 of code administration process 248 are also shown in FIG. 4 as components of code administration service 402.

As shown, assume that there is a QR code owner 404 that has registered to use code administration service 402 to generate secure scannable codes via code administration service 402, such as QR codes. For instance, QR code owner 404 may be an individual user or an organization that has registered to use code administration service 402. To begin the code creation process, QR code owner 404 may send a request 410 to code administration service 402 for a new QR code. In various embodiments, request 410 may include the following:
 A secret (S)—secret information known by QR code owner 404
 A target URL (TURL)—the URL that QR code owner 404 wishes to convert into verifiable URL (e.g., to protect its customers or its brand against possible attacks).

In some embodiments, on receipt of request 410, URL service engine 302 may first check whether the target URL of request 410 is not already blocked by code administration service 402. To do so, URL service engine 302 may send the TURL of request 410 on to URL analyzer 308 for assessment as request 412. In turn, URL analyzer 308 may assess the TURL for malicious acts such as bitsquatting, typo squatting, etc., perform focused queries on anti-phishing domain name search engines, apply DNS hijacking detection tools, etc. This may require interactions 414 with one or more DNS systems, such as DNS system 408 shown. For instance, URL analyzer 308 may leverage DNS-based tools such as Cisco Umbrella Investigate API, dnstwist, or the like, to perform a deep analysis with respect to suspicious websites and to prevent malware injection risks. In one embodiment, URL analyzer 308 may also perform a lookup 416 of the TURL in a database 418 of malicious URLs known to code administration service 402 that should be blocked.

In further embodiments, URL service engine 302 may perform interactions 414 with DNS system 408 and lookup 416 with database 418 in a closed-loop manner, such as via control loop 420. Doing so can also allow code administration service 402 to search for variations not only on the URLs that were already blocked and stored in database 418, but also on a list of verifiable URLs already stored in database 442, which stores verifiable URLs for later use. This type of search might help protect an entity that rightfully owns a QR code against intentional redirections to alternative URLs with the mere objective of attacking its customers or damaging its brand.

The results 422 of the analysis by URL analyzer 308 may then be sent back to URL service engine 302. Depending on results 422, URL service engine 302 may take various actions.

If URL analyzer 308 determines that the provided TURL is malicious, it may store the TURL in database 418 for future reference, including the identity of QR code owner 404. This can help code administration service 402 ensure that even its registered users are not attempting to embed malicious URLs into codes generated by code administration service 402. Depending on the severity of the threat detected, code administration service 402 might even block future attempts of the QR code owner 404 to generate new QR codes using code administration service 402.

Conversely, if URL analyzer 308 determines that the TURL of request 410 is not malicious, it may proceed to send a request 424 to a verification authority (VA) 406. For instance, VA 406 may take the form of a registered digital certification authority, such as IdenTrust, DigiCert, or the like. Accordingly, request 424 may include the identity of QR code owner 404, as well as the TURL of request 410. For instance, request 424 may take the form of a certificate signing request or a W3C compliant verifiable credential request, that VA 406 could attest to the ownership of the domain contained in the TURL.

Once attested, VA 406 may send a response 426 that includes a verifiable credential (VC) and may also include the IP address of the rightful owner of the TURL. After receiving response 426, URL service engine 302 may then send a key request 428 to key generator 304. Such a request may include the secret S, as well as the TURL, specified by QR code owner 404. Key generator 304 may then use the provided information in key request 428 to generate a key 430 by applying a function f( ) to the pair (S, TURL). In one embodiment, the function f( ) take the form of a hashing algorithm applied to the pair (S, TURL). Key generator 304 may then return the newly generated key 430 to URL service engine 302.

According to various embodiments, URL service engine 302 may then send an insert instruction 432 to database 442 that includes key 430 generated by key generator 304, the TURL specified in request 410, and the VC returned by VA 406 for QR code owner 404. Storing this mapping of URL, key information, and credential information in database 442, essentially serves as a fingerprint that binds the key and TURL with the credential information for QR code owner 404 that proves that QR code owner 404 actually owns the domain of the TURL.

Once the tuple (K, TURL, VC) is stored in database 442, URL service engine 302 may send the pair (K, TURL) as part of a code generation request 434 to code generator 306. In turn, in various embodiments, code generator 306 may perform a generation 436 of a QR or other scannable code that encodes the TURL and its key information. In one embodiment, code generator 306 may do so by using the key K as a verifiable QR code key (VQRCK) that code generator 306 appends to the TURL, prior to encoding it in a newly-generated QR code. For instance, assume that the TURL is as follows:
 www.target_URL.com.

In such a case, code generator 306 may append the VQRCK to this URL as follows:
 www.target_URL.com/VQRCK=23ac4fe690bcda98.

Code generator 306 may then generate a QR code 440 that embeds the above URL and provide it to QR code owner 404 via response 438. Once QR code owner 404 has QR code 440, it can then place QR code 440 in a location where it can be scanned, such as attached to a parcel, in a product item, on the side of a truck, in an advertisement, or the like.

Figure 5:
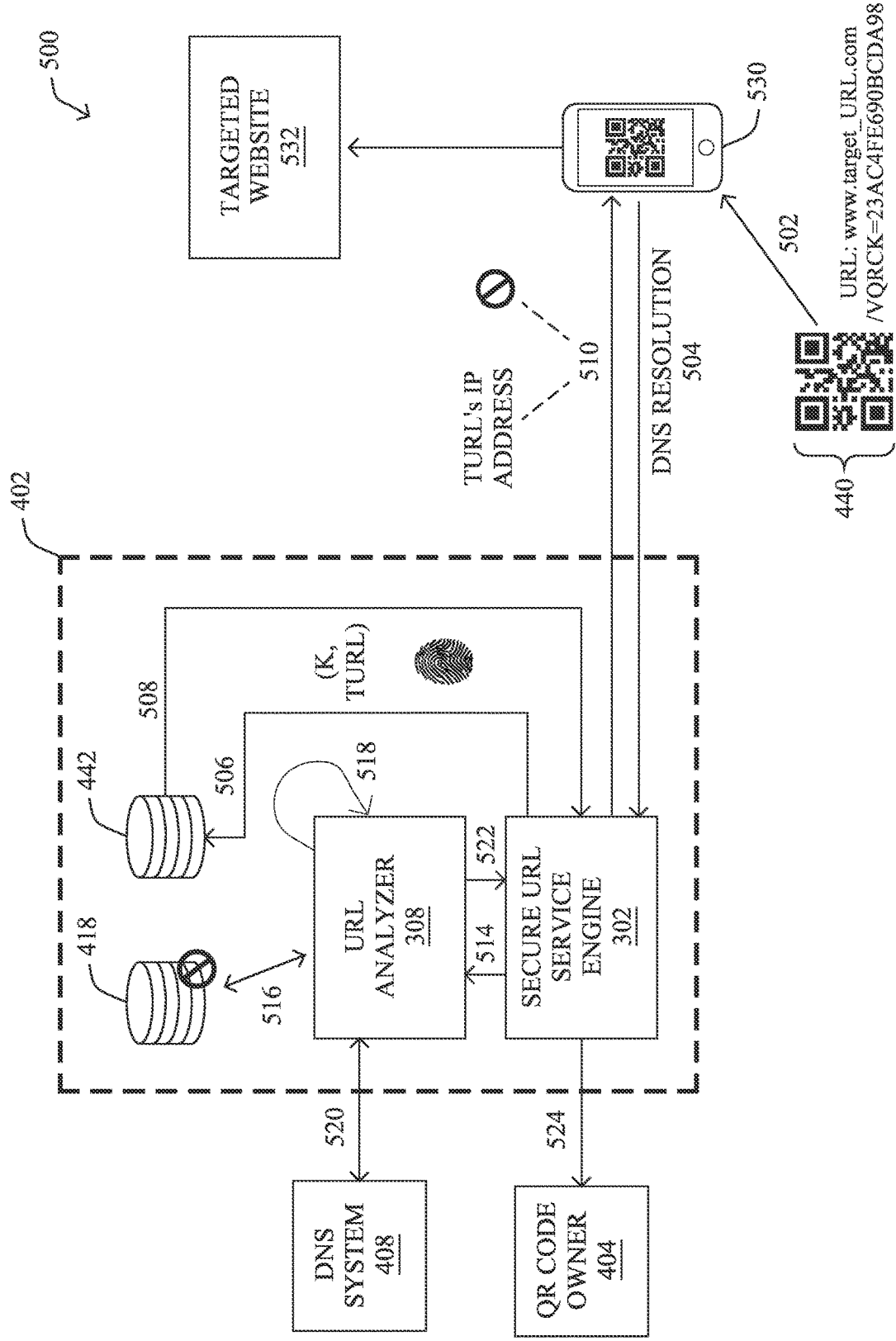
FIG. 5 illustrates an example of the code authentication service of FIG. 4 being used to resolve addresses.

FIG. 5 illustrates an example 500 of the code authentication service 402 of FIG. 4 being used to resolve addresses, according to various embodiments. As shown, assume now that a device 530 (e.g., a mobile device, a dedicated code reader, etc.) later performs a scanning 502 of the QR code 440 generated by code administration service 402. This may be done either by natively configuring device 530 to decode QR code 440 or by executing an application that is capable of decoding the appropriate data in QR code 440. Here, device 530 may extract the URL embedded into QR code 440 by code administration service 402.

In case the encoded information in QR code 440 contains a pointer to a URL, the URL must be resolved via DNS, necessitating an interaction between device 530 and the DNS infrastructure. In one embodiment, device 530 might be a managed or supervised device relying on code administration service 402 for the DNS resolution process. This is typically the case of managed devices that rely on Cisco Umbrella or other DNS management service for DNS resolution. In another embodiment, the application itself (e.g., the code scanner application) that runs on device 530 may be configured to use code administration service 402. Regardless, device 530 may send a DNS resolution request 504 to code administration service 402 for the URL embedded in QR code 440.

In response to DNS resolution request 504, URL service engine 302 may parse the URL in the request to extract out the TURL, as well as its associated key information, the key K appended to it as a VQRCK. URL service engine 302 may then perform a lookup query 506 for the (K, TURL) pair in database 442. In turn, database 442 may send a lookup response 508, indicating the results of the lookup.

In various embodiments, if URL service engine 302 found a valid entry for the pair (K, TURL) that has an associated verifiable credential (VC) in database 442, URL service engine 302 may determine that the verification process is considered successful. In turn, URL service engine 302 may send a DNS resolution response 510 to device 530 that indicates the IP address associated with the TURL. This IP address can be obtained from the VC stored in database 442 and included in lookup response 508. This allows device 530 to then send a webpage request 512 to the targeted website 532 associated with QR code owner 404.

However, if URL service engine 302 did not find a valid entry for (K, TURL) in database 442, it may determine that the verification process was unsuccessful and take corrective measures. In some embodiments, this may entail URL service engine 302 blocking device 530 from accessing the corresponding website. To do so, URL service engine 302 may return DNS resolution response 510 with an error notification, thereby blocking device 530. In some instances, the error notification can also be presented to device 530, to notify its user as to why the access was blocked.

In addition to blocking device 530 from accessing the website whose URL was embedded in the scanned QR code, code administration service 402 may also take steps to further assess the blocked URL, such as by sending an analysis request 514 to URL analyzer 308. In turn, URL analyzer 308 may repeat any or all of the same actions that it performed with respect to the TURL in FIG. 4. For instance, URL analyzer 308 may perform interactions 414 with DNS system 408 to determine a threat level of the URL, identify similar URLs, etc. URL analyzer 308 may also perform interactions with database 418, to add the blocked URL to the list of blocked URLs maintained by code administration service 402. In some cases, URL analyzer 308 may also perform this as part of a closed loop 420, to block both the original URL in DNS resolution request 504, as well as any similar/malicious URLs. URL analyzer 308 may then send a notification 522 to URL service engine 302, thereby allowing URL service engine 302 to send a message 524 to QR code owner 404, alerting them as to the attempted attack.

By construction, the keys K are not forgeable, so attempts to create QR codes with the aim of redirecting device 530 to a different URL from the target URL would be detected by code administration service 402. For instance, if a QR code contains a URL, such as www.target_URL.com/VQRCK=23ac4fe690bcda98, where the prefix (e.g., www.target_URL.com) does not match a URL in database 442 associated to the exact same key as in the suffix (i.e., 23ac4fe690bcda98), then code administration service 402 will detect the issue and block any attempt to open the URL.

Figure 6:
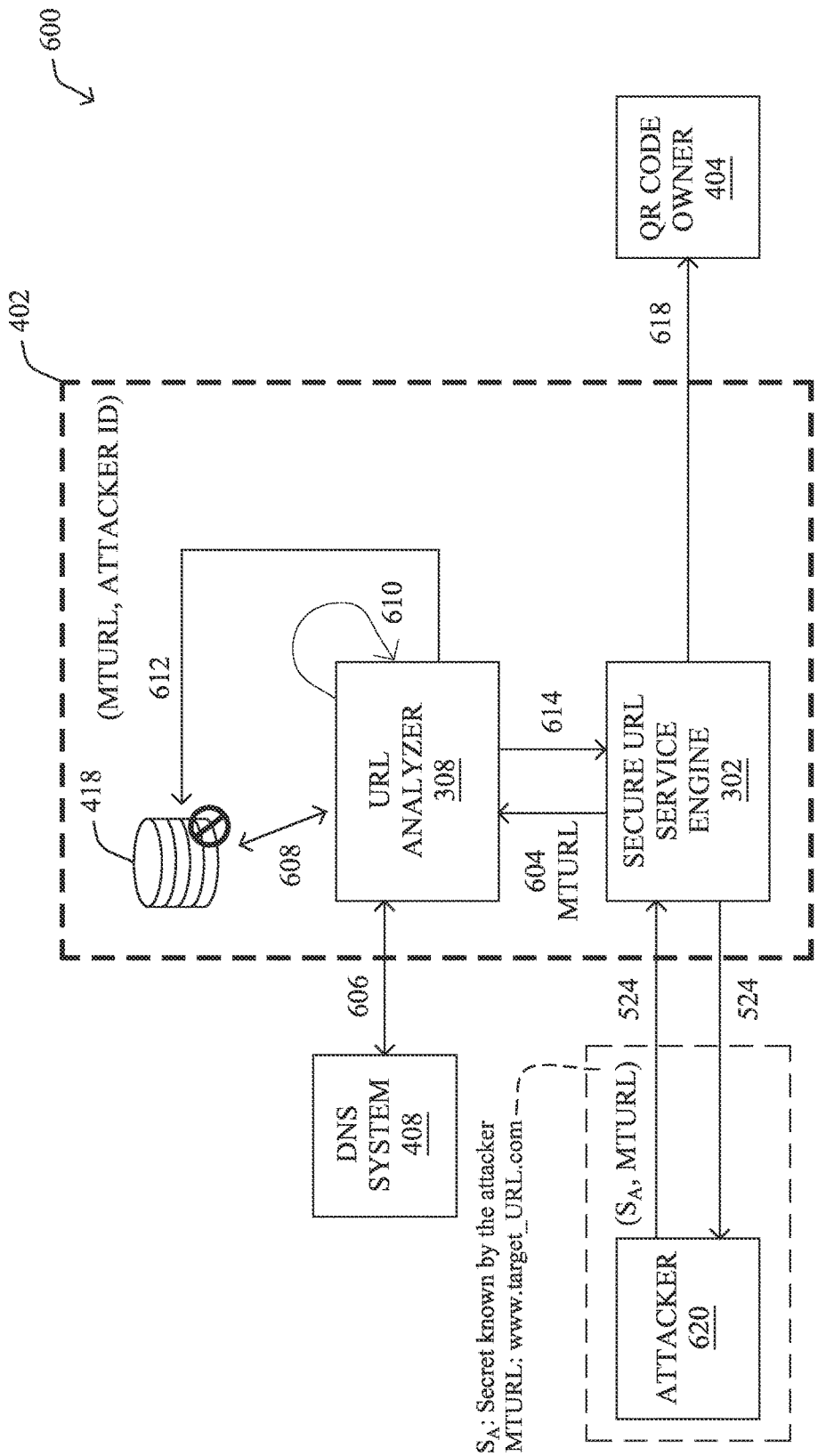
FIG. 6 illustrates an example of the code authentication service of FIG. 4 being used to block an attack.

In further embodiments, code administration service 402 may also be configured to prevent more elaborate attacks, as well. For instance, FIG. 6 illustrates an example 600 of code administration service 402 being used to block an attack. As shown, assume that an attacker 620 is able to gain registered credentials with code administration service 402. For example, attacker 620 may be affiliated with an organization that is already a registered client of code administration service 402. In this case, attacker 620 may have a valid secret SA and may try to impersonate the target URL (TURL) of another organization by creating a verifiable QR code based on a minor variation of that URL (e.g., by modifying the legitimate URL www.target-UTL.com to be www.target_URL.com), referred to herein as a malicious TURL (MTURL).

If code administration service 402 receives a code generation request 602 from attacker 620, it may proceed in a similar manner as that shown previously in FIG. 4. Notably, URL service engine 302 may extract out the MTURL from code generation request 602 and send it to URL analyzer 308 as part of a URL analysis request 604. In turn, URL analyzer 308 may perform interactions 606-608 with DNS system 408 and database 418, respectively. This can also be done in a loop 610, to detect that the MTURL corresponds to a minor alteration of an already registered URL (e.g., a TURL) in database 442. When this happens, URL analyzer 308 may add the MTURL to database 418, as well as an identifier for 620. URL analyzer 308 may then send a notification 614 to URL service engine 302.

In some instances, URL service engine 302 may send a notification 616 back to attacker 620 indicating that code generation request 602 has been denied. In addition, or in lieu thereof, URL service engine 302 may also send a notification 618 to QR code owner 404.

In a further enhancement, code administration service 402 may also prevent race conditions, such as when attacker 620 intentionally attempts to request a verifiable QR code with a MTURL for an organization that is not yet a registered user of code administration service 402. In such a case, the URL of that organization will not yet be in code administration service 402. Such a case can be prevented by allowing VA 406 in FIG. 4 to also become a client of system 402. For instance, URL analyzer 308 may determine the proximity of the string with a reputable URL and flag the findings to VA 406. In turn, VA 406 may decide whether a verifiable credential (VC) should be issued or not. If it opts not to issue a VC, then code administration service 402 may notify the problem back to the requestor and a scannable code will not be generated.

In further embodiments, a variation of the above techniques can be used to produce QR codes which may only embed the key K. In such cases, the application is running the scanning device may, by default, direct the query to code administration service 402. The advantage in this case is that the mere presence of a URL in the QR code indicates that it is not a verifiable QR code. Thus, code administration service 402 may block the attempt to reach the URL contained in the QR code, or it may alert the user about the risk, or even redirect and proxy the connection through a threat detection service.

In an alternative embodiment, the key K could be used as a verifier. In such cases, code administration service 402 may respond to a DNS resolution request with both the IP address of the TURL, as well as the results of the function hash (K, TURL). For instance, the application running in device 530 may now compute the same function by hashing the key K and the URL obtained from the QR code. If the result matches with the string received from the code administration service 402, then the application running in 530 may proceed to connect to the URL contained in the QR code.

In yet another embodiment, instead of conveying the key K as a suffix in the URL, it may be conveyed as part of an API call to code administration service 402.

For managed devices, their scanning application may be implemented in a number of different ways. For instance, the capabilities above described might be instrumented by the camera application in a mobile phone along with a Mobile Device Management (MDM) system. In this case, the end user might not need to install any new application to the mobile phone, besides the MDM software, since all DNS resolution requests will be directed to code administration service 402, anyways. They may also be implemented by a security application running on the phone or terminal, via a collaboration application (e.g., Webex Teams, etc.), a social network application (e.g., WhatsApp, Facebook, etc.), by an application offered through an application store, or the like.

For unmanaged scanning devices (e.g., devices that do not use a trusted service such as Cisco Umbrella), both the DNS resolution request and the subsequent traffic might not be routed to code administration service 402. As an additional enhancement, code administration service 402 may also offer the possibility to generate different types of scannable codes with the aim of producing verifiable codes that could be scanned and validated even through unmanaged devices. In such cases, code generator 306 generate a QR code that embeds a URL that points to code administration service 402 and includes the key information. From the provided key information, code administration service 402 may determine the target URL and proxy the connection towards the desired destination.

Figure 7:
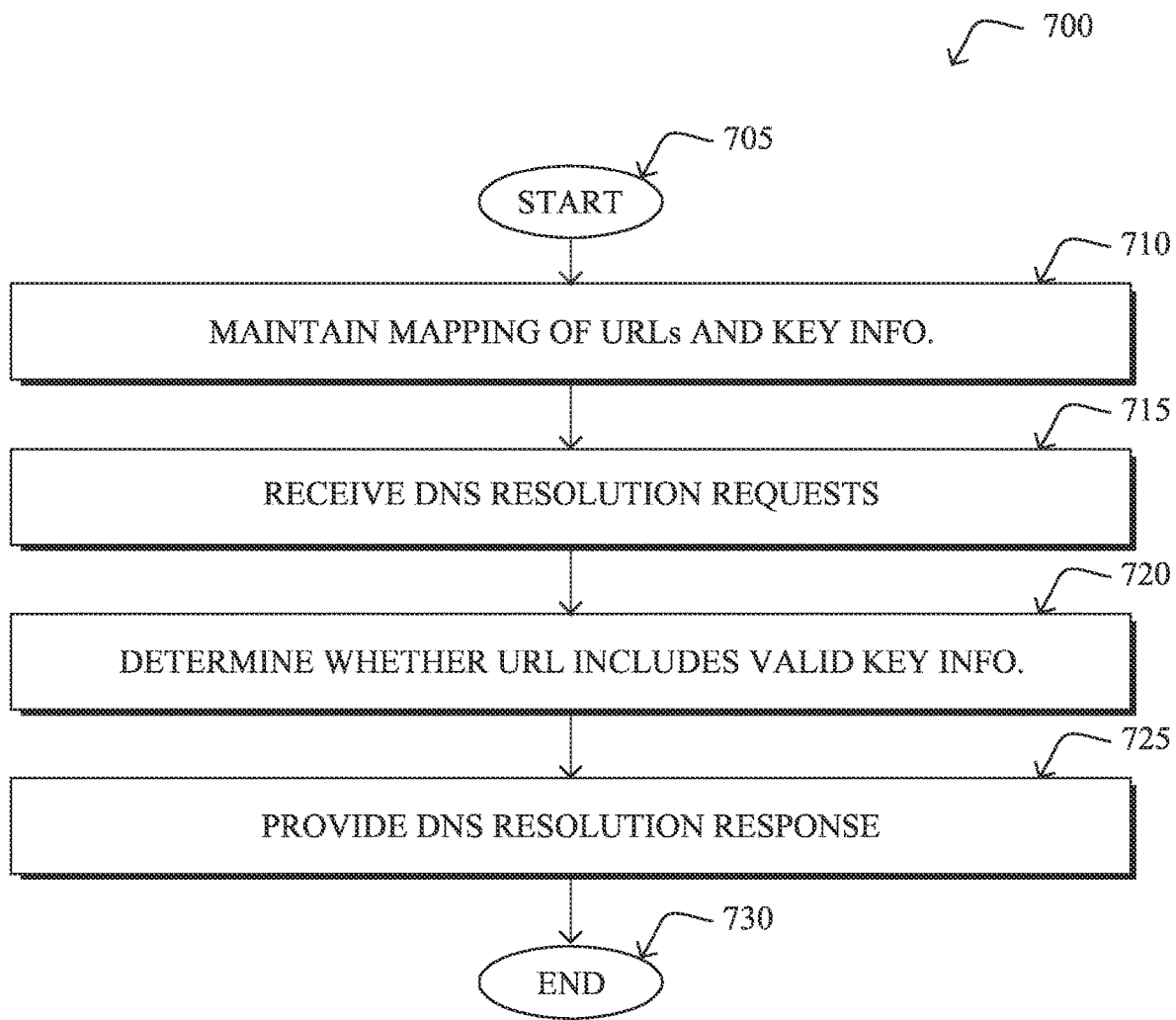
FIG. 7 illustrates an example simplified procedure for authenticating a URL embedded in a scannable code.

FIG. 7 illustrates an example simplified procedure (e.g., a method) for authenticating a URL embedded in a scannable code, in accordance with one or more embodiments described herein. For example, a non-generic, specifically configured device (e.g., device 200), may perform procedure 700 by executing stored instructions (e.g., code administration process 248). The procedure 700 may start at step 705, and continues to step 710, where, as described in greater detail above, the device may maintain a mapping of URLs and key information embedded into codes. For instance, the codes may include QR codes or other codes that can be used for purposes of item tracking or identification, conveying additional content to a user, etc.

At step 715, as detailed above, the code authentication service may receive, from a requesting device, a DNS resolution request for a particular URL. In some embodiments, the requesting device may send the DNS resolution request in response to scanning a code in which the particular URL is embedded. In various embodiments, the code authentication service may also receive key information for the particular URL, either as part of the resolution request or separately, such as via an API. In further embodiments, the service may generate a code having the particular uniform resource locator embedded, on behalf of an authenticated user of the code authentication service.

At step 720, the code authentication service may determine, based on the mapping, whether the domain name system resolution request is associated with valid key information for the particular uniform resource locator. In general, the key information is used to ensure that the code scanned by the requesting device, as well as its embedded URL, are registered and trusted by the code authentication service. To this end, in various embodiments, the code authentication service may itself generate the particular URL and/or embed the key information into a target URL, to form the particular URL.

At step 725, as detailed above, the code authentication service may provide, to the requesting device, a domain name system resolution response, when the code authentication service determines that the DNS resolution request includes valid key information for the particular URL, as described in greater detail above. In general, the response may indicate indicates an address associated with the particular uniform resource locator. Conversely, the code authentication service may prevent the requesting device from accessing the particular uniform resource locator and/or send a notification, when it determines that the DNS resolution request does not include valid key information for the particular URL, in various embodiments. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism to ensure the validity/authenticity of URLs embedded into scannable codes, such as QR codes and the like. Doing so can help to prevent users from being directed to counterfeit or malicious websites, unbeknownst to themselves, while believing themselves to be viewing a legitimate website.

While there have been shown and described illustrative embodiments that provide for URL validation and redirection for scannable codes, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of scannable codes are discussed herein, the techniques herein may be used in conjunction with any form of code capable of embedding a URL.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
maintaining, by a code authentication service and as database entries, a mapping of uniform resource locators and key information embedded into scannable codes;
receiving, at the code authentication service and from a requesting device, a domain name system resolution request for a particular uniform resource locator, wherein the code authentication service receives the key information as part of the domain name system resolution request;
determining, by the code authentication service and based on the mapping whether the domain name system resolution request is associated with valid key information for the particular uniform resource locator;
providing, by the code authentication service and to the requesting device, a domain name system resolution response that indicates an address associated with the particular uniform resource locator, when the code authentication service determines that the domain name system resolution request includes valid key information for the particular uniform resource locator; and
notifying, when the code authentication service determines that the domain name system resolution request for a scan of a particular scannable code does not include valid key information for the particular uniform resource locator, an owner of the particular scannable code of the scan.

2. The method as in claim 1, wherein the particular uniform resource locator is embedded into a Quick Response (QR) code.

3. The method as in claim 1, further comprising:
generating a code having the particular uniform resource locator embedded, on behalf of an authenticated user of the code authentication service.

4. The method as in claim 1, wherein the requesting device sends the domain name system resolution request in response to scanning a code in which the particular uniform resource locator is embedded.

5. The method as in claim 1, further comprising:
generating, by the code authentication service, the key information for the particular uniform resource locator.

6. The method as in claim 5, wherein the code authentication service generates the key information for the particular uniform resource locator by:
embedding the key information into a target uniform resource locator, to form the particular uniform resource locator.

7. The method as in claim 1 wherein the code authentication service receives the key information via an application programming interface.

8. The method as in claim 1, further comprising:
sending a notification, when the code authentication service determines that the domain name system resolution request does not include valid key information for the particular uniform resource locator.

9. The method as in claim 1, further comprising:
preventing, by the code authentication service, the requesting device from accessing the particular uniform resource locator, when the code authentication service determines that the domain name system resolution request does not include valid key information for the particular uniform resource locator.

10. An apparatus, comprising:
one or more network interfaces;
a processor coupled to the one or more network interfaces and configured to execute one or more processes; and
a memory configured to store a process that is executable by the processor, the process when executed configured to:
maintain, as database entries, a mapping of uniform resource locators and key information embedded into codes;
receive, from a requesting device, a domain name system resolution request for a particular uniform resource locator, wherein domain name system resolution request is received at a code authentication service and wherein the code authentication service receives the key information as part of the domain name system resolution request;
determine, based on the mapping maintained as database entries, whether the domain name system resolution request is associated with valid key information for the particular uniform resource locator;
provide, to the requesting device, a domain name system resolution response that indicates an address associated with the particular uniform resource locator, when the apparatus determines that the domain name system resolution request includes valid key information for the particular uniform resource locator; and
notify, when the code authentication service determines that the domain name system resolution request for a scan of a particular scannable code does not include valid key information for the particular uniform resource locator, an owner of the particular scannable code of the scan.

11. The apparatus as in claim 10, wherein the particular uniform resource locator is embedded into a Quick Response (QR) code.

12. The apparatus as in claim 10, wherein the process when executed is further configured to:
generate a code having the particular uniform resource locator embedded, on behalf of an authenticated user of a code authentication service provided by the apparatus.

13. The apparatus as in claim 10, wherein the requesting device sends the domain name system resolution request in response to scanning a code in which the particular uniform resource locator is embedded.

14. The apparatus as in claim 10, wherein the process when executed is further configured to:
generate the key information for the particular uniform resource locator.

15. The apparatus as in claim 14, wherein the apparatus generates the key information for the particular uniform resource locator by:
embedding the key information into a target uniform resource locator, to form the particular uniform resource locator.

16. The apparatus as in claim 10, wherein the apparatus receives the key information via an application programming interface.

17. The apparatus as in claim 10, wherein the process when executed is further configured to:
prevent the requesting device from accessing the particular uniform resource locator, when the apparatus determines that the domain name system resolution request does not include valid key information for the particular uniform resource locator.

18. A tangible, non-transitory, computer-readable medium storing program instructions that cause a code authentication service to execute a process comprising:

maintaining, by the code authentication service and as database entries, a mapping of uniform resource locators and key information embedded into codes;

receiving, at the code authentication service and from a requesting device, a domain name system resolution request for a particular uniform resource locator, wherein the code authentication service receives the key information as part of the domain name system resolution request;

determining, by the code authentication service and based on the mapping maintained as database entries, whether the domain name system resolution request is associated with valid key information for the particular uniform resource locator;

providing, by the code authentication service and to the requesting device, a domain name system resolution response that indicates an address associated with the particular uniform resource locator, when the code authentication service determines that the domain name system resolution request includes valid key information for the particular uniform resource locator; and notifying, when the code authentication service determines that the domain name system resolution request for a scan of a particular scannable code does not include valid key information for the particular uniform resource locator, an owner of the particular scannable code of the scan.

* * * * *